United States Patent [19]

Ishihara

[11] Patent Number: 5,799,222
[45] Date of Patent: Aug. 25, 1998

[54] CAMERA WITH FILM CARTRIDGE LOADING FEATURE

[75] Inventor: Masaaki Ishihara, Yokohama, Japan

[73] Assignee: Canon Kabushiki Kaisha, Tokyo, Japan

[21] Appl. No.: 250,347

[22] Filed: May 27, 1994

Related U.S. Application Data

[63] Continuation of Ser. No. 808,879, Dec. 18, 1991, abandoned.

[30] Foreign Application Priority Data

Dec. 21, 1990 [JP] Japan ................................ 2-412618
Jan. 14, 1991 [JP] Japan ................................ 3-015970

[51] Int. Cl.$^6$ ........................................................ G03B 17/02
[52] U.S. Cl. ..................................................... 396/538
[58] Field of Search ................................... 354/174, 275, 354/288, 21, 64; 242/71.1; 396/511, 518, 538

[56] References Cited

U.S. PATENT DOCUMENTS 4,841,319  6/1989  Hansen ............................... 354/275
4,870,437  9/1989  Omaki et al. ......................... 354/64
4,982,221  1/1991  Ishimura et al. ................. 354/289.12
5,122,823  6/1992  Baxter et al. ....................... 354/212
5,142,316  8/1992  Tanii et al. .......................... 354/212
5,159,365  10/1992  Takahashi et al. ................... 354/21

FOREIGN PATENT DOCUMENTS 3113578  10/1982  Germany .
62-201428  9/1987  Japan .
0186331  6/1990  Japan ................................ 354/275
2154245  6/1990  Japan .
2186331  7/1990  Japan .

*Primary Examiner*—Eddie C. Lee
*Assistant Examiner*—Nicholas J. Tuccillo
*Attorney, Agent, or Firm*—Fitzpatrick, Cella, Harper & Scinto

[57] ABSTRACT

A camera includes a film cartridge chamber in which a film cartridge is loaded by being inserted therein in an axial direction of the film cartridge, a locking claw for locking the film cartridge when it is loaded at a desired position in the film cartridge chamber, and an indicating unit for indicating that the film cartridge is not loaded at the desired position in the film cartridge chamber in response to a state in which the locking claws is not locking the film cartridge which has been inserted into the film cartridge chamber.

60 Claims, 10 Drawing Sheets

FIG. 2(b)
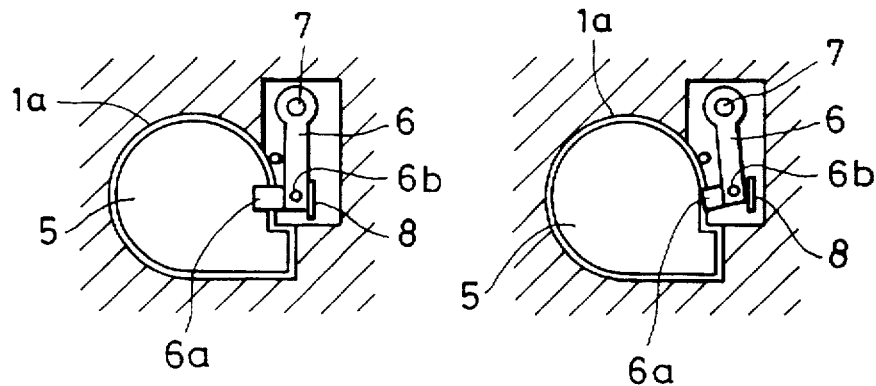
FIG. 2(c)
FIG. 2(a)
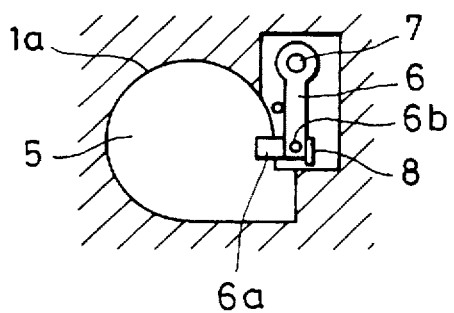
FIG. 3
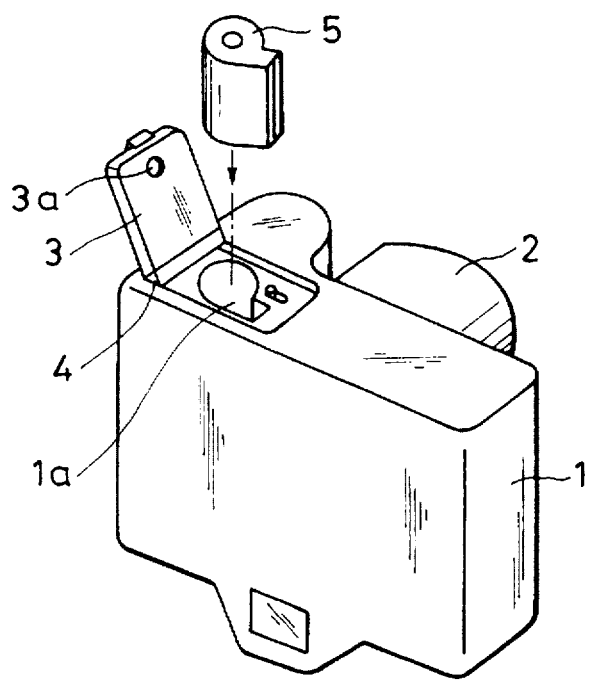

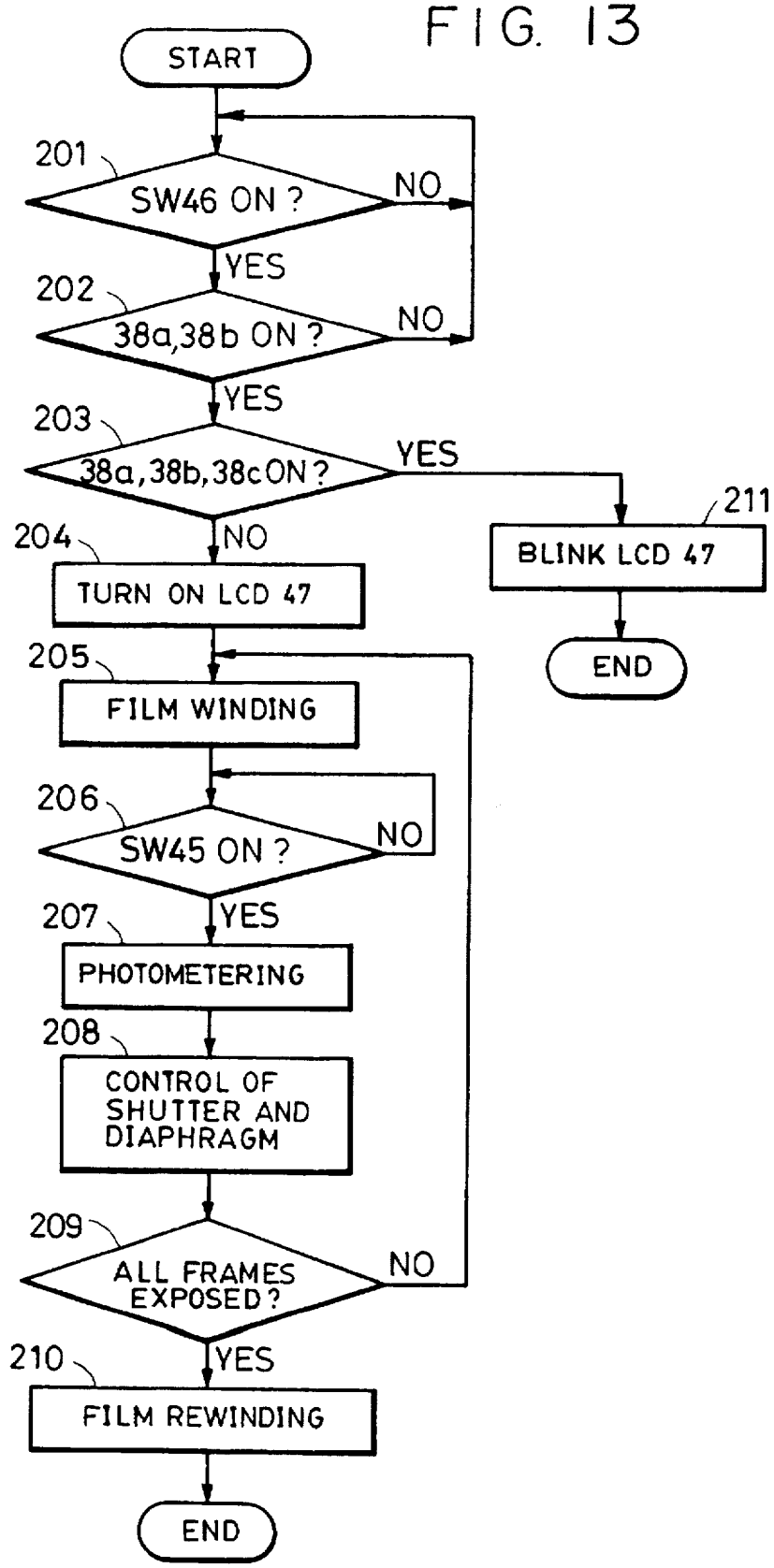

CAMERA WITH FILM CARTRIDGE LOADING FEATURE

This application is a continuation of application Ser. No. 07/808,879 filed Dec. 18, 1991, now abandoned.

BACKGROUND OF THE INVENTION

1. Field of the Invention

The present invention relates to an improvement of a camera of a type in which a film cartridge is loaded into a film cartridge chamber by being inserted therein in the axial direction of the film cartridge.

2. Description of the Related Art

Japanese Patent Laid-Open No. 201428/1987 discloses a camera of the type in which a film cartridge is loaded into a film cartridge chamber by being inserted therein in the axial direction of the film cartridge. In this type of camera, after the film cartridge is loaded, it is pushed into the correct position by a lid which makes contact with an end portion of the film cartridge when it is closed.

In the above-described conventional camera, since the distance between the lid and the end portion of the film cartridge to be loaded is short, the film cartridge can be pushed in directly by the lid. However, when that film cartridge loading method is adopted in a camera in which the film cartridge chamber is deep and the film cartridge is hence pushed a long distance, a long projection must be provided on the lid to ensure that the film cartridge is pushed into the correct position. However, the long projection disturbs the film cartridge loading operation, which is done when the lid is open. In the worst case, the projection may be caught and break.

Accordingly, a film cartridge loading method has been proposed such that when a film cartridge is pushed into the correct position directly by hand without using the lid, a claw engages the film cartridge to prevent the film cartridge from springing or otherwise or coming out of the cartridge chamber.

This film loading method does not require the provision of a long projection on the lid. However, when the stroke through which the film cartridge is pushed is long, the operator may unconsciously stop pushing in the film cartridge midway to the correct position and may close the lid in that state. If the camera is operated with the film cartridge loaded into an incorrect position, not only does film winding become impossible but also the film cartridge or the camera may be damaged.

SUMMARY OF THE INVENTION

In view of the aforementioned problems of the conventional techniques, a primary object of the present invention is to provide a camera which comprises a film cartridge chamber in which a film cartridge is loaded by being inserted therein in the axial direction of the film cartridge, a locking means for locking the film cartridge when the film cartridge is inserted into a desired position in the film cartridge chamber, and an indication means for indicating that the film cartridge is not loaded at the desired position in the film cartridge chamber in response to a state in which the locking means is not locking the film cartridge inserted into the film cartridge chamber.

The invention in another aspect pertains to a camera including a chamber in which an image recording medium is loaded; holding means for holding the image recording medium when it is loaded into a desired position in the chamber; and indication means for indicating that the image recording medium is not loaded into the desired position in the chamber in response to a state wherein the holding means is not holding the image recording medium which is loaded in the chamber.

The invention in a further aspect pertains to a film cartridge loading device for a camera. The device includes a film cartridge chamber in which a film cartridge is loaded by being inserted therein in an axial direction of the film cartridge; locking means for locking the film cartridge when the film cartridge is inserted into a desired position in the film cartridge chamber; and indication means for indicating that the film cartridge is not inserted into the desired position in the film cartridge chamber in response to a state wherein the locking means is not locking the film cartridge inserted into the film cartridge chamber.

The invention in a yet further aspect pertains to an image recording medium loading device for a camera. The device includes a chamber in which an image recording medium is loaded; holding means for holding the image recording medium when it is loaded into a desired position in the chamber; and indication means for indicating that the image recording medium is not loaded into the desired position in the chamber in response to a state in which the holding means is not holding the image recording medium which is loaded in the chamber.

Consequently, in the aforementioned camera, it is possible to avoid a film cartridge loading failure.

Other objects of the present invention will become clear from the following description of the preferred embodiments

BRIEF DESCRIPTION OF THE DRAWINGS

FIGS. 2(a), 2(b) and 2(c) are horizontal cross-sectional views of the essential parts of the first embodiment of the camera according to the present invention;

FIG. 3 is a perspective view of the first embodiment of the present invention;

FIG. 13 is a flowchart of the operation of the control circuit shown in FIG. 11.

DETAILED DESCRIPTION OF THE PREFERRED EMBODIMENTS

Figure 1A:
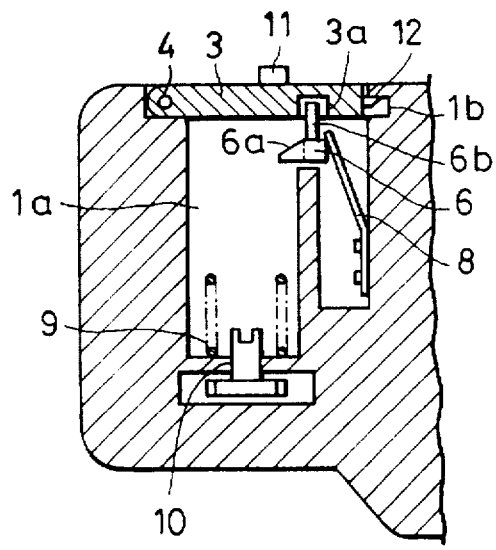
FIGS. 1(a), 1(b) and 1(c) are vertical cross-sectional views of the essential parts of a first embodiment of a camera according to the present invention.

Embodiments of the present invention will be described below with reference to the accompanying drawings.

A first embodiment of the present invention will be described first with reference to FIGS. 1(a), 1(b) and 1(c) to 3.

Referring first to FIG. 3, which is a perspective view of a camera, reference numeral 1 denotes a camera body; 1a, a film cartridge chamber; 2, a lens; 3, a lid supported on the camera body 1 in such a manner as to be pivotal about a shaft 4 to open and close an opening of the film cartridge chamber 1a; 3a, recess formed in the lid 3; and 5, a film cartridge.

Turning now to FIGS. 1(a) to 1(c) and 2(a) to 2(c) which are respectively vertical and horizontal cross-sectional views of the essential parts of the camera, a claw 6 having a tapered portion 6a and a projecting portion 6b is supported on the camera body 1 in such a manner as to be rotatable about a shaft 7. The claw 6 is urged clockwise by a spring 8 fixed to the camera body 1 as viewed in FIG. 2. A pushing spring 9 urges the film cartridge 5 loaded into the film cartridge chamber 1a in an upward direction. A fork 10 engages with an engaging portion 5a of the film cartridge 5 and thereby winds or rewinds the film when it is driven by a motor which is not shown. An unlocking lever 11 and a locking claw 12, which are formed integrally with each other, are held by the lid 3 in such a manner so as to be slidable in the direction indicated by the bidirectional arrow in FIG. 1(b). The unlocking lever 11 and the locking claw 12 are urged by a spring (not shown) to the right so that the locking claw 12 can be engaged with an engaging groove 1b of the camera body 1 to close the lid 3.

In FIGS. 1 and 2, FIG. 1(a) and FIG. 2(a) indicate the state in which no film cartridge 5 is loaded in the film chamber 1a. FIG. 1(b) and FIG. 2(b) show the state in which the film cartridge 5 is loaded into its desired position in the film chamber 1a. Finally, FIG. 1(c) and FIG. 2(c) denote the state in which the film cartridge 5 is in the film chamber 1a but is not loaded into its desired position.

Figure 1B:
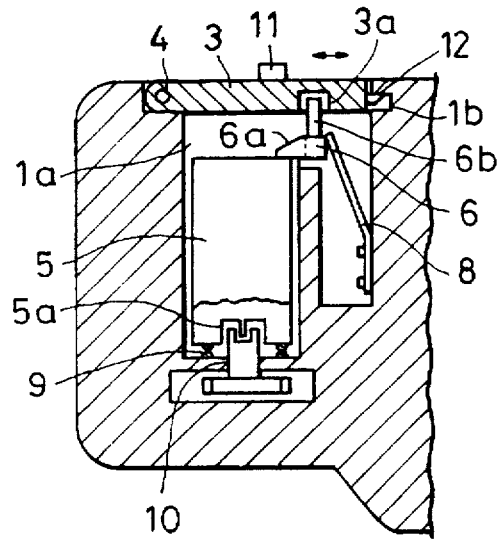

In the camera arranged in the manner described above, to load the film cartridge 5, the locking claw 12 is unlocked from the groove 1b by sliding the unlocking lever 11 to the left as viewed in FIG. 1, and then the film cartridge chamber 1a is opened by pivoting the lid 3 about the shaft 4. Next, the film cartridge 5 is loaded in the axial direction into the film cartridge chamber 1a. At that time, the lower end surface of the film cartridge 5 first comes into contact with the tapered portion 6a of the claw 6, rotating the claw 6 counterclockwise against the spring 8 as viewed in FIG. 2. When the film cartridge 5 is pushed further, the lower end surface of the film cartridge 5 makes contact with the pushing spring 9 and then the film cartridge 5 is pushed down against the spring 9 until the upper end surface of the film cartridge 5 reaches the lower end surface of the claw 6. At that time, the claw 6 is rotated clockwise by the spring 6 as viewed in FIG. 2 and locks the upper end surface of the film cartridge 5, by which loading of the film cartridge in the desired position is completed (shown in FIG. 1(b) and 2(b)). In that state, the engaging portion 5a of the film cartridge 5 is in engagement with the fork 10.

Thereafter, the lid 3 is closed. At that time, the projecting portion 6b of the lever 6 enters the recess 3a in the lid 3, and hence does not interfere with the closing operation of the lid 3.

To unload the film cartridge 5 after all the frames have been exposed, the lid 3 is opened by sliding the unlocking lever 11 to the left as viewed in FIG. 1, and then the projecting portion 6b of the lever 6 is rotated counterclockwise by the operator's finger to disengage the claw 6 from the film cartridge 5 as viewed in FIG. 2(c). Consequently, the film cartridge 5 is pushed in an upward direction by the spring 9 and is ready for unloading.

The operation when the film cartridge 5 is not pushed down to the desired position will now be explained.

Figure 1C:
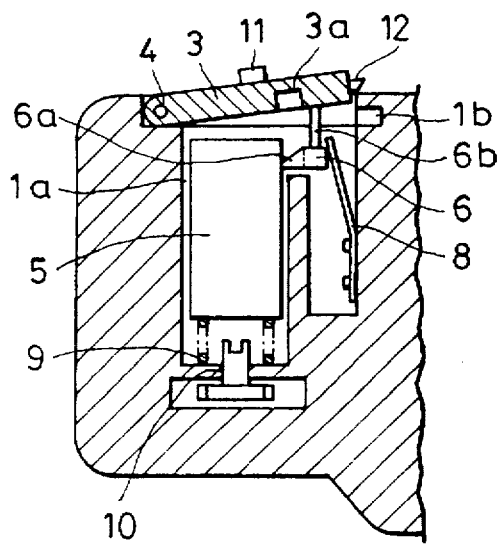

When the film cartridge 5 is not pushed down to the desired position, as shown in FIG. 1(c) and FIG. 2(c), the lid 3 cannot be closed completely because the projecting portion 6b is not in alignment with the recess 3a in the lid 3 and hence interferes with the closing of the lid 3. Consequently, the operator readily knows that the film cartridge 5 has not been loaded correctly, and thus prevents disability of film winding or breakage of the film cartridge or camera.

A second embodiment of the present invention will now be described with reference to FIGS. 4(a), 4(b) and 4(c) to 7. In this embodiment, the parts or components identical to those in the first embodiment are denoted by the same reference numerals, and a description thereof is omitted.

Figure 4A:
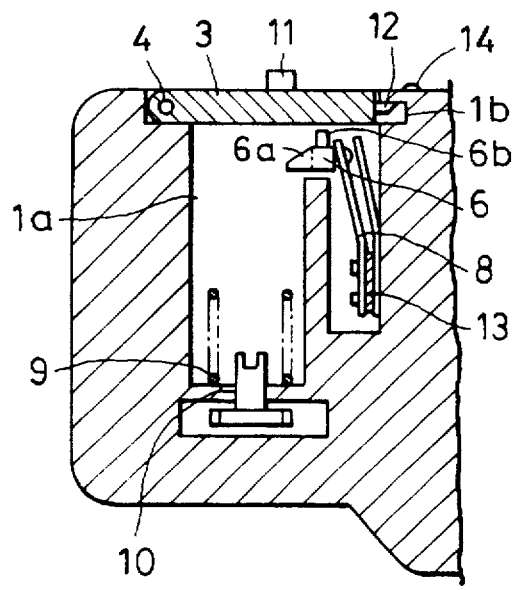
FIGS. 4(a), 4(b) and 4(c) are vertical cross-sectional views of the essential parts of a second embodiment of the camera according to the present invention.
Figure 4B:
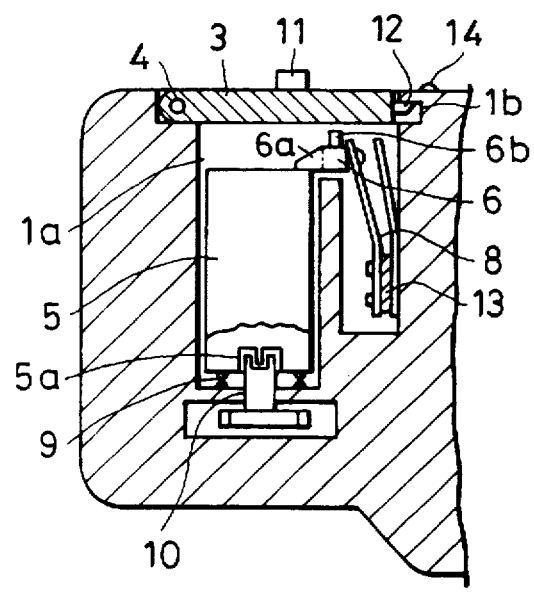
Figure 4C:
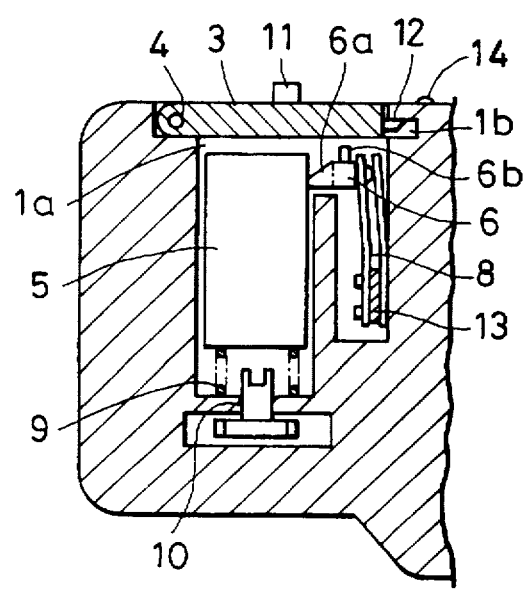
Figure 5:
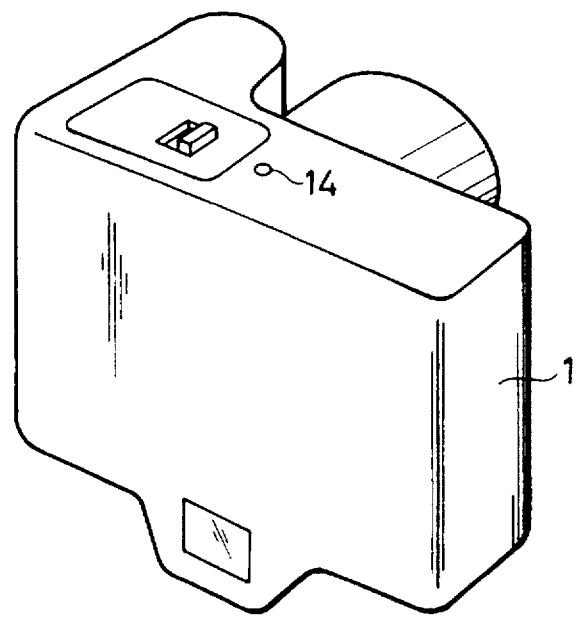
FIG. 5 is a perspective view of the second embodiment of the present invention.

FIGS. 4(a) through 4(c) are vertical cross-sectional views of the essential parts of the second embodiment, and FIG. 5 is a perspective view of the second embodiment.

In FIGS. 4(a), 4(b), 4(c) and 5, reference numeral 13 denotes a detection switch for urging the lever 6 clockwise, i.e., to the left as viewed in FIG. 4. An alarm display LED is turned on when the detection switch 13 is closed.

In this embodiment, when no film cartridge 5 is loaded or when the film cartridge 5 is located at the desired position, as shown in FIGS. 4(a) and 4(b), respectively, the detection switch 13 is opened. When the film cartridge 5 is not pushed into the desired position, as shown in FIG. 4(c), the lever 6 is rotated counterclockwise (to the right as viewed in FIG. 4) and retracted, and the detection switch 13 is thereby closed, turning on the alarm display LED 14 as described below.

Figure 6:
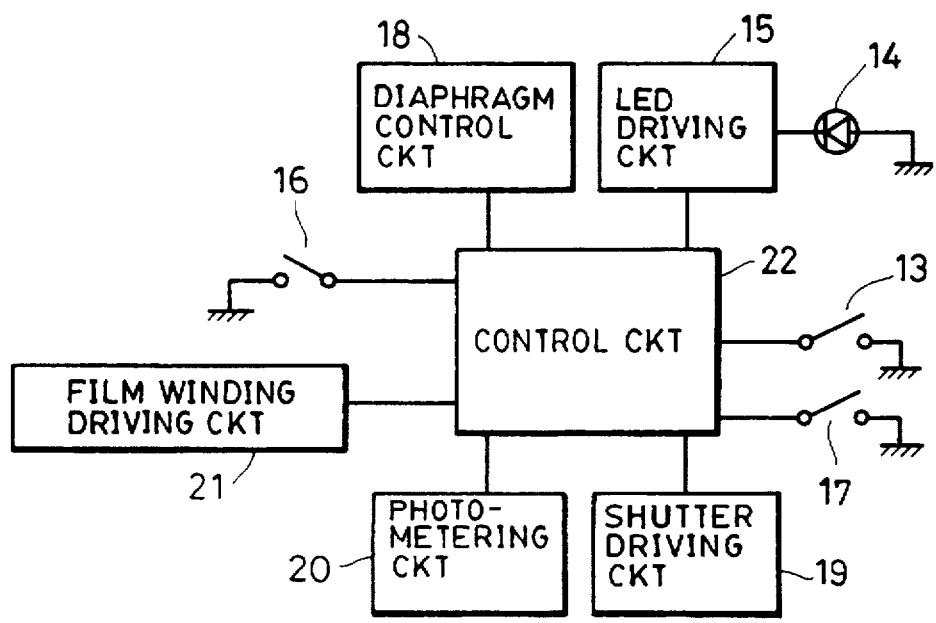
FIG. 6 is a circuit diagram of the second embodiment of the present invention.

FIG. 6 is a block diagram of the electric circuits of the second embodiment of the camera. Reference numeral 15 denotes an LED driving circuit 15 provided on the camera body for driving the alarm display LED 14; 16, a release switch; 17, a lid switch which is turned on when the lid 3 is closed; 18, a diaphragm control circuit; 19, a shutter driving circuit; 20, a photometering circuit; 21, a film winding driving circuit; and 22, a control circuit comprising a microcomputer for controlling the individual circuits of the camera.

Figure 7:
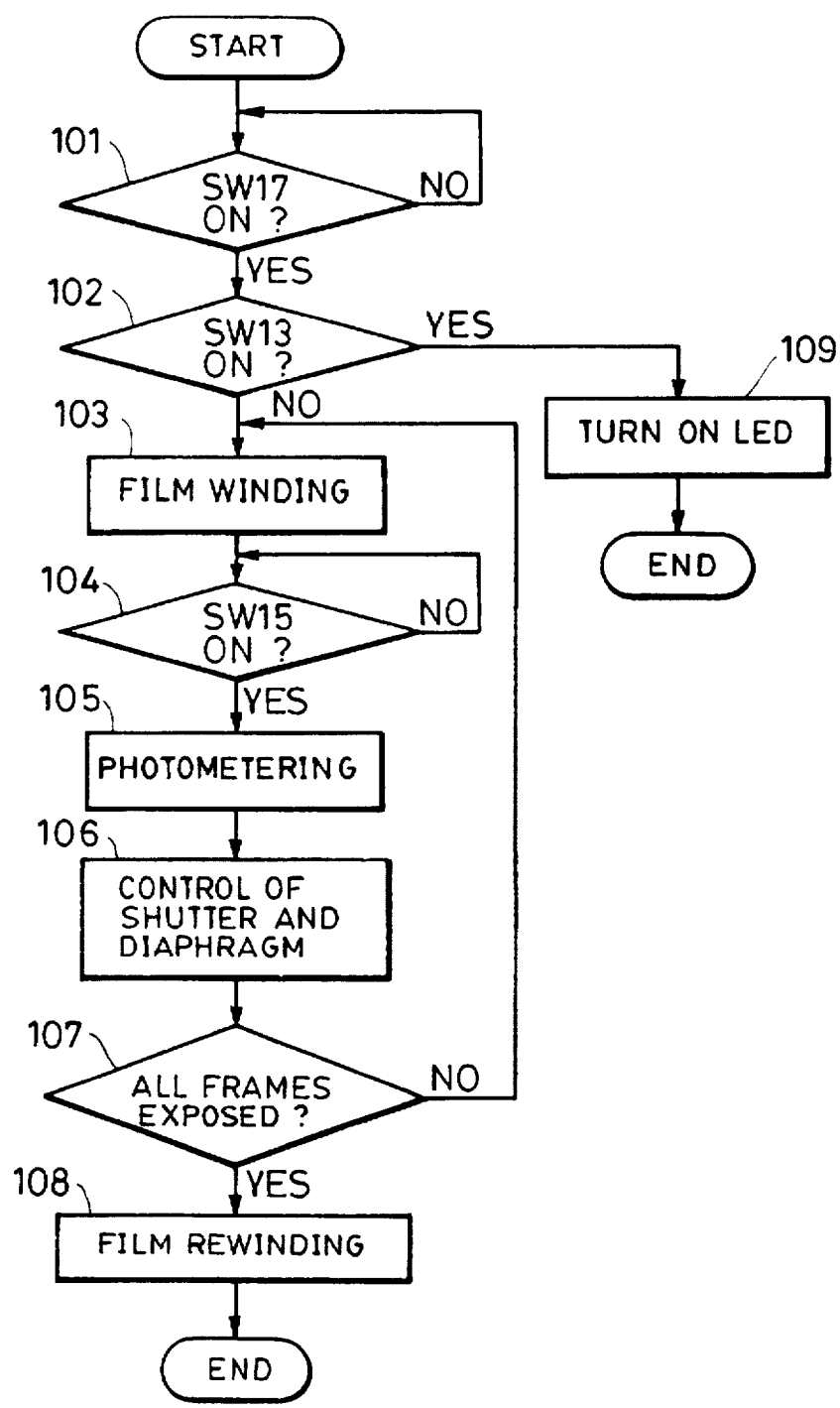
FIG. 7 is a flowchart of the operation of a control circuit shown in FIG. 6.

The operation of the control circuit 22 shown in FIG. 6 now will be described below with reference to FIG. 7.

First it is determined in step 101 whether the lid switch 17 is turned on. If the lid switch 17 is turned on, the process goes to step 102, and it is determined whether the switch 13 is on. If the switch 13 is not turned on, i.e., if the film cartridge 5 is loaded at the desired position, the process goes to step 103. If the detection switch 13 is on, i.e., if the film cartridge 5 is not loaded at the desired position, the process goes to step 109, and the alarm display LED 14 is driven through the LED driving circuit 15 to alert the photographer that the cartridge is not correctly loaded. In step 103, auto loading of the film is conducted by the film winding driving circuit 21 and a predetermined position of the film is thereby selected. Thereafter, it is determined in step 104 whether the release switch 16 is turned on. If the release switch 16 is turned on, the photometric operation is conducted through the photometry circuit 20 in step 105, and then the shutter and diaphragm are controlled through the shutter control circuit 19 and the diaphragm control circuit 19 in step 106.

Subsequently, it is determined in step 107 whether all the frames have been exposed. If the answer is negative, the process returns to step 103. If all the frames have been exposed, the process goes to step 108, and rewinding of the film cartridge 5 is conducted.

In this embodiment, the LED is used as the indication means which alerts the operator that the film cartridge 5 is not loaded at the desired position. Alternatively, an LCD also may be used.

A third embodiment of the present invention will be described below with reference to FIGS. 8(a), 8(b) and 8(c) to 13.

Figure 10:
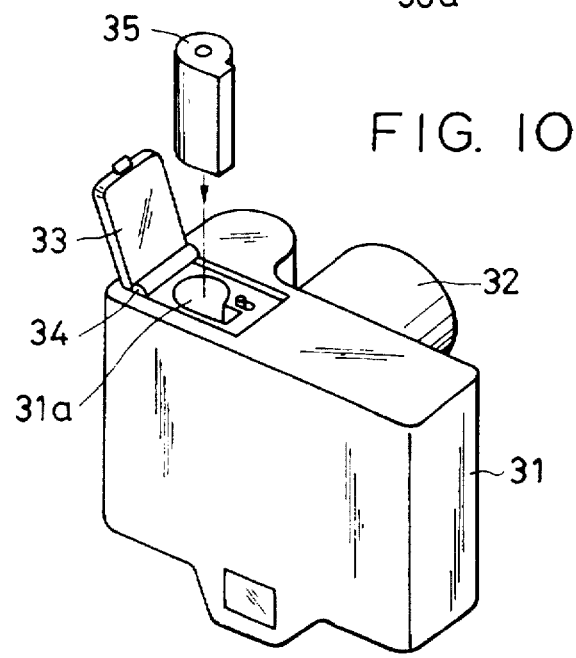
FIG. 10 is a perspective view of the third embodiment of the present invention.

FIG. 10 is a perspective view of the third embodiment of the present invention.

In FIG. 10, reference numeral 31 denotes a camera body; 31a, a film cartridge chamber; 32, a lens; 33, a lid supported on the camera body 31 in such a manner as to be pivotal about a shaft 34 for opening and closing an opening of the film cartridge chamber 31a; and 35, a film cartridge.

Figure 9A:
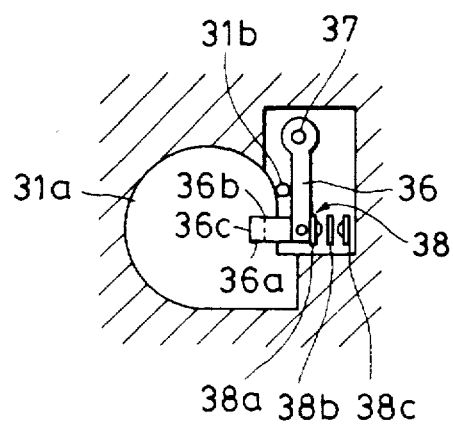
FIGS. 9(a), 9(b) and 9(c) are horizontal cross-sectional views of the essential parts of the third embodiment of the present invention.
Figure 9B:
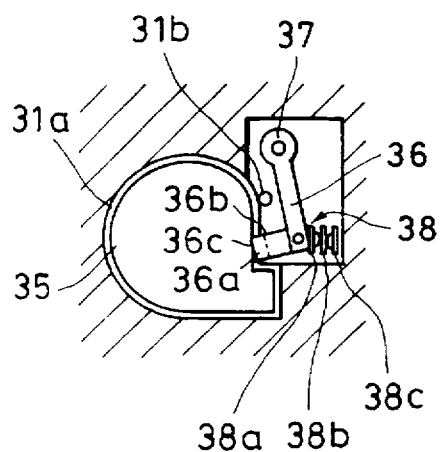
Figure 9C:
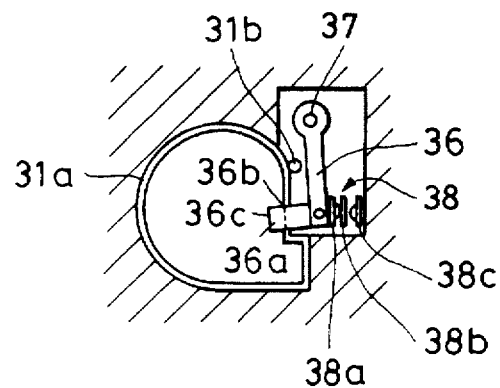

FIGS. 9(a), 9(b) and 9(c) are horizontal cross-sectional views of the essential parts of the third embodiment. In these figures, a claw 36 having a tapered portion 36a, a locking portion 36b indicated by a broken line and a tapered distal end portion 36c is supported on the camera body 31 in such a manner as to be rotatable about a shaft 37. A detection switch 38 has contact pieces 38a, 38b and 38c. The contact piece 38a urges the claw 36 clockwise until the claw 36 makes contact with a stopper 31b provided on the camera body and is thereby positioned. FIG. 9(a) indicates a state in which no film cartridge 35 is loaded. FIG. 9(b) shows a state in which the film cartridge 35 is loaded but not pushed into its proper position, and FIG. 9(c) denotes a state in which the film cartridge 35 is loaded at its proper position.

Figure 8A:
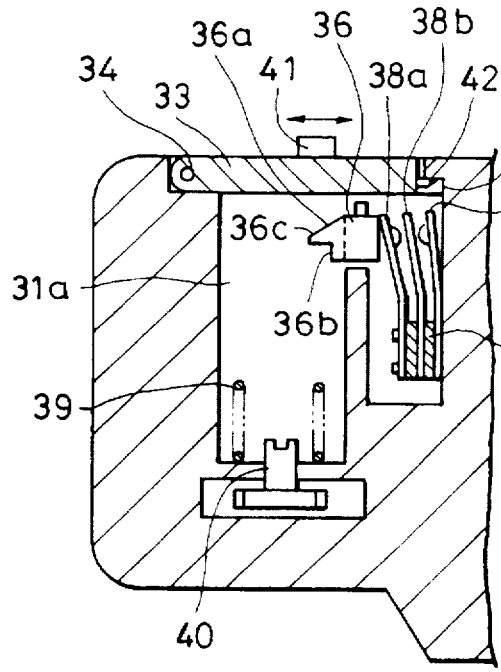
FIGS. 8(a), 8(b) and 8(c) are vertical cross-sectional views of the essential parts of a third embodiment of the camera according to the present invention.
Figure 8B:
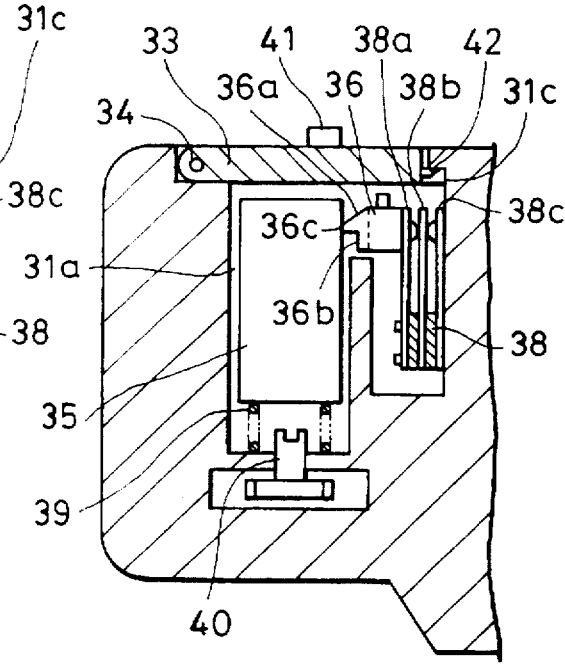
Figure 8C:
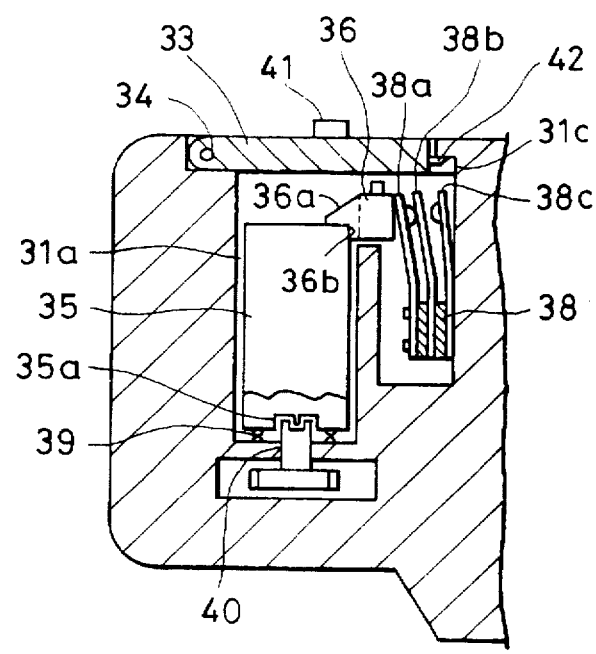

FIGS. 8(a) to 8(c) are vertical cross-sectional views of the essential parts of the third embodiment. A pushing spring 39 urges the film cartridge 35 loaded into the film cartridge chamber 31a in an upward direction. A fork 40 engages with an engaging portion 35a of the film cartridge 35 and thereby winds or rewinds the film when it is driven by a motor (not shown). An unlocking lever 41 and a locking claw 42, which are formed integrally with each other, are held by the lid 33 in such a manner so as to be slidable in the direction indicated by bidirectional arrow in FIG. 8(a). The unlocking lever 41 which locks the lid 33 and the locking claw 42 are urged by a spring (not shown) to the right so that the locking claw 42 can be engaged with an engaging groove 31c of the camera body 31 to close the lid 33.

FIGS. 8(a), 8(b) and 8(c) respectively correspond to FIGS. 9(a), 9(b) and 9(c). When no film cartridge is loaded, the claw 36 is in contact with the stopper 31b, and the contact pieces of the detection switch 38 are not in contact with each other (see FIGS. 8(a) and 9(a)). When the film cartridge 35 is loaded at the desired position, the engaging portion 36b of the claw 36 is in contact with the upper end portion of the film cartridge 35. Consequently, the claw 36 is pivoted counterclockwise as viewed in FIG. 9, and the contact pieces 38a and 38b of the detection switch 38 are thereby in contact with each other (see FIGS. 8(c) and 9(c)). When the film cartridge 35 is not loaded to the desired position, the tapered distal end portion 36c of the claw 36 is in contact with the side surface of the film cartridge 35. Consequently, the claw 36 is pivoted counterclockwise as viewed in FIG. 9, and the contact pieces 38a, 38b and 38c of the detection switch 38 are in contact with each other (see FIGS. 8(b) and 9(b)).

Figure 11:
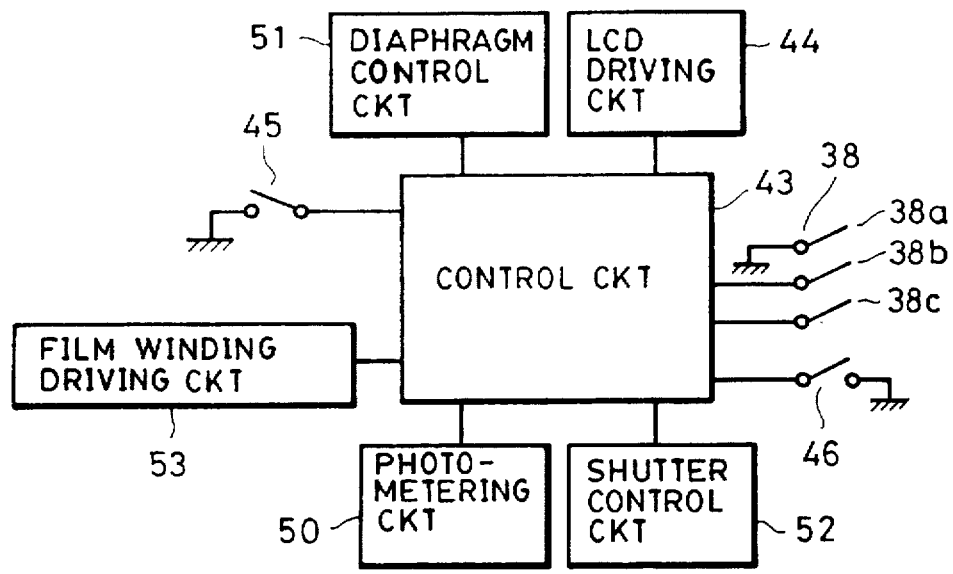
FIG. 11 is a circuit diagram of the essential parts of the third embodiment of the present invention.

FIG. 11 is a circuit diagram of the third embodiment of a camera according to the present invention. Reference numeral 43 denotes a control circuit comprising a microcomputer for controlling the individual circuits of the camera; 44, a liquid crystal device circuit (LCD driving circuit) provided on the camera body for driving a display (LCD) which will be described later; 45, a release switch; 46, a lid detection switch which is turned on when the lid 33 is closed; 50, a photometering circuit; 51, a diaphragm control circuit; 52, a shutter control circuit; and 53, a film winding driving circuit.

Figures 12A, 12B, 12C:
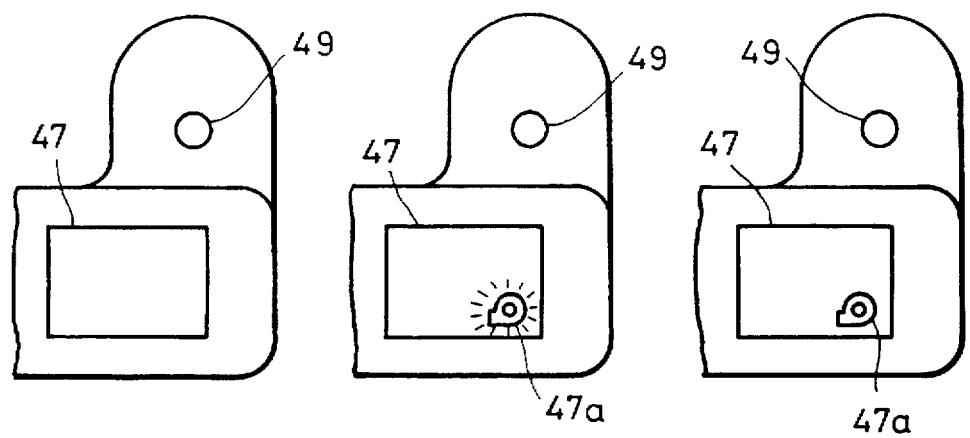
FIG. 12 is a plan view showing examples of display made by a display device provided in the camera of the third embodiment according to the present invention.

FIG. 12(a), 12(b) and 12(c) show an example of an LCD 47 display driven by the LCD driving circuit 44. Reference numeral 47a denotes a symbol indicating the state when the film cartridge 35 is loaded; and 49 denotes a release button.

In the camera arranged in the manner described above, to load the film cartridge 35, the locking claw 42 is first unlocked from the groove 31c by causing the unlocking lever 41 to slide to the left as viewed in FIG. 8, and then the film cartridge chamber 31a is opened by pivoting the lid 33 about the shaft 34. Next, the film cartridge 35 is loaded into the film cartridge chamber 31a by being inserted therein in the axial direction of the film cartridge. At that time, the lower end surface of the film cartridge 35 first comes into contact with the tapered portion 36a of the claw 36, rotating the claw 36 counterclockwise as viewed in FIG. 9. Consequently, the tapered distal end portion 36c of the claw 36 makes contact with the side surface of the film cartridge 35, and the detection switch 38 is pushed by the claw 35, causing all the contact pieces 38a, 38b and 38c to be brought into contact with each other. When the film cartridge 35 is pushed in further, the lower end surface of the film cartridge 35 subsequently makes contact with the pushing spring 39 and then the film cartridge 35 is pushed down against the spring 39 until the upper end surface of the film cartridge 35 rides the tapered distal end portion 36c of the claw 36. At that time, the claw 36 is rotated clockwise as viewed in FIG. 8 by the urging force of the contact piece 38a and the locking portion 36b of the claw 36 thereby makes contact with the upper end surface of the film cartridge 35, by which loading of the film cartridge 35 to the desired position is completed (shown in FIG. 8(c)). In this correct loaded state, the contact piece 38a is in contact with the contact piece 38b.

The control circuit 43 determines the state of the detection switch 38 in the manner described below, and provides the display shown in FIG. 12. More specifically, when no contact pieces of the detection switch 38 are in contact with each other (when no film cartridge 35 is loaded), the control circuit 43 does not turn on the LCD 47 (as shown in FIG. 12(a)). When all the contact pieces 38a, 38b and 38c of the detection switch 38 are in contact with each other, i.e., when the film cartridge 35 is not loaded at the desired position, the LCD 47 is turned on to make the symbol 47a blink for alarming as shown in FIG. 12(b). When the contact pieces 38a and 38b are in contact with other, i.e., when the film cartridge 35 is loaded at the desired position, the symbol 47a is lit up as shown in FIG. 12(C).

The operation of the control circuit 43 shown in FIG. 11 now will be described below with reference to FIG. 13.

First it is determined in step 201 whether the lid switch 46 is turned on. If the lid switch 46 is turned on, the process goes to step 202, and it is determined whether the contact pieces 38a and 38b of the detection switch 38 are in contact with each other. If the contact pieces 38a and 38b are in contact with each other, i.e., if the film cartridge 35 is present, the process goes to step 203. If the contact pieces 38a and 38b are not in contact with each other, i.e., if no film cartridge 35 is loaded, the process returns to step 201.

In step 203, it is determined whether the contact pieces 38a, 38b and 38c of the detection switch 38 are in contact with each other. If they are not in contact with each other, i.e., if the film cartridge 35 is loaded at the desired position, the process goes to step 204. If they are in contact with each other, i.e., if the film cartridge 35 is not loaded at the desired position, the process goes to step 211.

In step 204, the LCD 47 is driven through the LCD driving circuit 44 and a display is made indicating that the film cartridge 35 is loaded at the desired position as shown in FIG. 12(c). Thereafter, in step 205, the film transport driving circuit 53 is driven to perform auto loading of the film and selection of the first frame thereof is thereby made. Thereafter, it is determined in step 206 whether the release switch 45 is turned on. If the release switch 45 is turned on, the photometric data is obtained through the photometering circuit 50 in step 207, and then the known exposure operation is conducted through the diaphragm control circuit 51 and the shutter control circuit 52 in step 208.

Subsequently, it is determined in step 209 whether all the frames are exposed. If the answer is negative, the process returns to step 205. If all the frames are exposed, the process goes to step 210, and the film winding driving circuit 53 is driven to conduct rewinding of the film.

If it is determined in step 203 that the contact pieces 38a, 38b and 38c are in contact with each other, i.e., if the film cartridge 35 is not loaded at the desired position, the process goes to step 211 as described above. In step 211, the display 47 is driven through the LCD driving circuit 44 to perform an alarm display indicating that the film cartridge 35 is not loaded at the desired position as shown in FIG. 12(b).

Figure 14A:
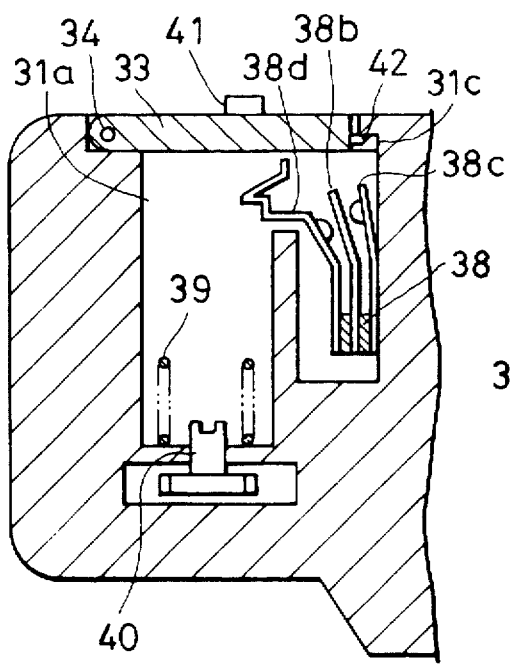
FIGS. 14(a), 14(b) and 14(c) are vertical cross-sectional views of the essential parts of a fourth embodiment of the camera according to the present invention.
Figure 14B:
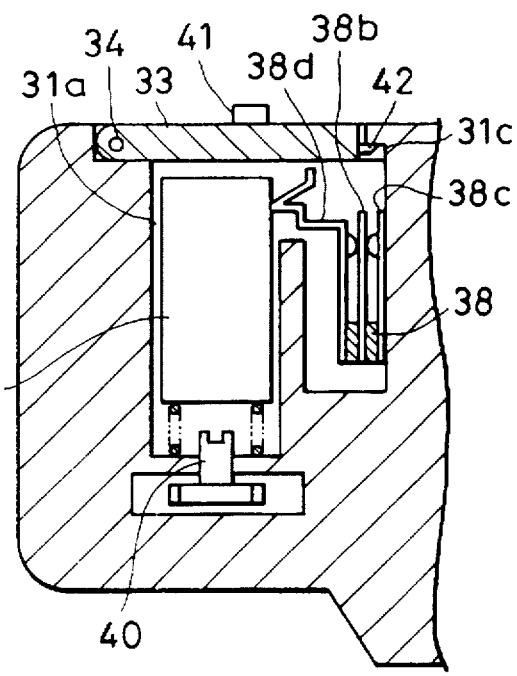
Figure 14C:
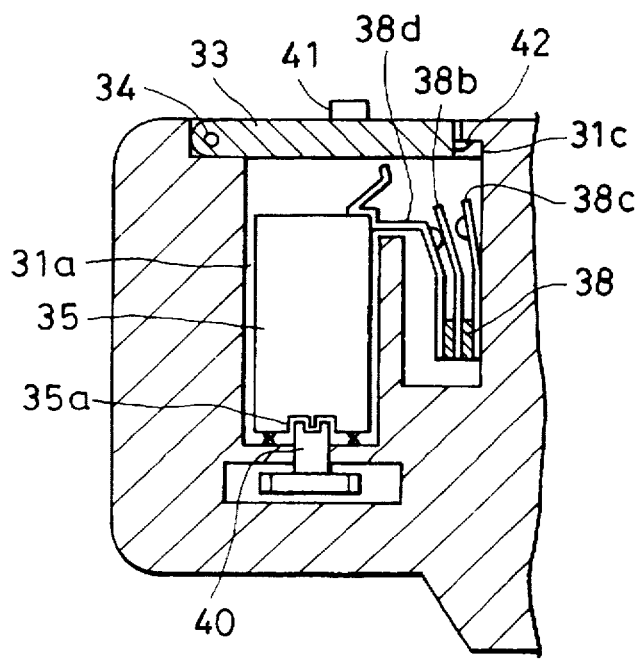

FIG. 14 is a vertical cross-sectional view of the essential parts of a fourth embodiment of a camera according to the present invention.

This fourth embodiment differs from the third embodiment in that the engaging claw 36 is abolished, and in that the film cartridge 35 is locked by a contact piece 38d corresponding to the contact piece 38a of the detection switch 38. Since the other configurations are the same as those of the third embodiment, the corresponding parts or components are denoted by the same reference numerals, and a description thereof is omitted.

As will be understood from the foregoing description, in the first embodiment, the projecting portion is provided on the lever for preventing dislodging of the film cartridge, and the recess is formed in the lid. Hence, if the film cartridge is not loaded at the desired position, the photographer is alerted by the impossibility of being able to close the lid. Therefore, the photographer is advised to reload the film cartridge, and the film cartridge can thus be loaded correctly. It is also possible to prevent disability of the film transport and breakage of the film cartridge or camera.

In the second embodiment of the present invention, since the incorrect loading of the film cartridge is indicated by the LED or LCD, the same effect as that obtained in the first embodiment can be obtained.

In the second to fourth embodiments, since it is not necessary to provide a film cartridge detection switch conventionally provided separately from the film cartridge chamber, the structure of the film cartridge chamber can be simplified. Furthermore, when the film cartridge detection switch and the locking claw are constructed separately, even though the film cartridge is loaded at the desired position and is locked at that position by the locking claw, it may be impossible for the film cartridge detection switch to detect that the film cartridge is at the desired position. Alternatively, even though the film cartridge is not loaded in the desired position and is therefore not locked by the locking claw, it may be possible for the film cartridge detection switch to erroneously detect that the film cartridge is loaded at the desired position. However, in the second to fourth embodiments of the present invention, such an erroneous operation can be eliminated, and the state of the film cartridge can be accurately displayed. This enables accurate loading of the film cartridge.

In the second to fourth embodiments, a display means is used as the means for indicating the detected state of the film cartridge. However, an alarm indication may be made using a sounding body in place of the display. More specifically, when the film cartridge is loaded at the desired position, the sounding body may make a sound for a predetermined period of time. When the film cartridge is not loaded at the desired position, the sounding body may make a sound intermittently at a predetermined frequency.

In the aforementioned embodiments, when the film cartridge is not loaded at the desired position, an alarm indication is made. If the film transport operation is inhibited when the film cartridge is not loaded at the desired position, breakage of the film cartridge or camera can be more effectively prevented.

The present invention can also be applied to cameras of a type other than that in which the film cartridge is loaded into the film cartridge chamber by being inserted thereinto in the axial direction of the film cartridge.

Also, the present invention can employ image recording media other than film.

The individual components shown in outline and designated by blocks in the drawings are all well-known in the camera arts and their specific construction and operation are not critical to either the operation or the best mode for carrying out invention.

The present invention has been described with respect to what is presently considered to be the preferred embodiments. It is to be understood that the invention is not limited to the disclosed embodiments. To the contrary, the invention is intended to cover the various modifications and equivalent arrangements included within the spirit and scope of the appended claims. The scope of the following claims is to be accorded the broadest interpretation so as to encompass all such modifications and equivalents structures and functions.

What is claimed is:

1. A camera comprising:

a film cartridge chamber in which a film cartridge is loaded by being inserted therein in an axial direction of the film cartridge;

a locking device which automatically locks the film cartridge in the film cartridge chamber only in response to full insertion of the film cartridge into said film cartridge chamber, said locking device locking the film cartridge in a position in which a film contained in the film cartridge is in alignment with a film transporting path for photographic operation of the film; and a detection device which detects a position of said locking device and which determines whether the film cartridge is locked in the position by said locking device in accordance with the position of said locking device.

2. The camera according to claim 1, further comprising a lid for closing said film cartridge chamber, and wherein said detection device comprises a device which provides an indication that the film cartridge is not inserted into the desired position in said film cartridge chamber by restricting a closing operation of said lid of said film cartridge chamber.

3. The camera according to claim 1, wherein said detection device comprises a display for displaying that the film cartridge is not inserted into the desired position in said film cartridge chamber.

4. The camera according to claim 1, wherein said detection device comprises a device which provides an audible alarm that the film cartridge is not inserted into the desired position in said film cartridge chamber.

5. The camera according to claim 1, wherein said detection device comprises a switch which determines that said locking device is not locking the film cartridge inserted into said film cartridge chamber.

6. The camera according to claim 5, wherein said switch comprises an elastic member which biases said locking device.

7. The camera according to claim 6, wherein said switch comprises a device which holds said locking device.

8. The camera according to claim 6, wherein said locking device is formed integrally with said switch.

9. The camera according to claim 5, wherein said switch comprises a device which holds said locking device.

10. The camera according to claim 1, wherein said detection device comprises an indicator which indicates that the film cartridge is inserted into the desired position in said film cartridge chamber.

11. The camera according to claim 10, wherein said detection device comprises an indicator which indicates that the film cartridge is not inserted in said film cartridge chamber.

12. The camera according to claim 1, wherein said detection device comprises a display which displays that the film cartridge is inserted into the desired position in said film cartridge chamber.

13. The camera according to claim 12, wherein said detection device comprises a display which displays that the film cartridge is not inserted in said film cartridge chamber.

14. A camera comprising:
  a chamber in which an image recording medium is loaded by being inserted therein;
  a holding device which automatically holds the image recording medium in the chamber only in response to full insertion of the image recording medium into said chamber, said holding device holding the image recording medium in a position in which the image recording medium is in alignment with an image recording medium transporting path for photographic operation of the image recording medium loaded into said chamber; and
  a detection device which detects a position of said holding device and which determines whether the image recording medium is loaded in the position by said holding device in accordance with the position of said holding device.

15. The camera according to claim 14, further comprising a lid for closing said chamber, and wherein said detection device comprises an indicator which indicates that the image recording medium is not loaded into the desired position in said chamber by restricting a closing operation of said lid of said chamber.

16. The camera according to claim 14, wherein said detection device comprises a display for displaying that the image recording medium is not loaded into the desired position in said chamber.

17. The camera according to claim 14, wherein said detection device comprises a device which provides an audible alarm that the image recording medium is not loaded into the desired position in said chamber.

18. The camera according to claim 14, wherein said detection device comprises a switch which determines that said holding device is not holding the image recording medium loaded in said chamber.

19. The camera according to claim 18, wherein said switch comprises an elastic member which urges said holding device.

20. The camera according to claim 19, wherein said switch comprises a device which holds said holding device.

21. The camera according to claim 19, wherein said holding device is formed integrally with said switch.

22. The camera according to claim 18, wherein said switch comprises a device which holds said holding device.

23. The camera according to claim 14, wherein said detection device comprises an indicator which indicates that the image recording medium is loaded into the desired position in said chamber.

24. The camera according to claim 23, wherein said detection device comprises an indicator which indicates that the image recording medium is not loaded in said chamber.

25. The camera according to claim 14, wherein said detection device comprises a display which displays that the image recording medium is loaded into the desired position in said chamber.

26. The camera according to claim 25, wherein said detection device comprises a display which displays that the image recording medium is not loaded in said chamber.

27. A film cartridge loading device for a camera, said device comprising:
  a film cartridge chamber in which a film cartridge is loaded by being inserted therein in an axial direction of the film cartridge;
  a locking device which automatically locks the film cartridge in said film cartridge chamber only in response to full insertion of the film cartridge into said film cartridge chamber, said locking device locking the film cartridge in a position in which a film contained in the film cartridge is in alignment with a film transporting path for photographic operation of the film; and
  a detecting device which detects a position of said locking device and which determines whether the film cartridge is locked in the position by said locking device, in accordance with the position of said locking device.

28. The cartridge loading device according to claim 27, further comprising a lid for closing said chamber, and wherein said detection device comprises an indicator which indicates that the film cartridge is not inserted into the desired position in said film cartridge chamber by restricting a closing operation of said lid of said film cartridge chamber.

29. The film cartridge loading device according to claim 27, wherein said detection device comprises a display for displaying that the film cartridge is not inserted into the desired position in said film cartridge chamber.

30. The film cartridge loading device according to claim 27, wherein said detection device comprises a device which provides an audible alarm that the film cartridge is not inserted into the desired position in said film cartridge chamber.

31. The film cartridge loading device according to claim 27, wherein said detection device comprises a switch which determines that said locking device is not locking the film cartridge inserted into said film cartridge chamber.

32. The film cartridge loading device according to claim 31, wherein said switch comprises an elastic member which urges said locking device.

33. The film cartridge loading device according to claim 32, wherein said switch comprises a device which holds said locking device.

34. The film cartridge loading device according to claim 32, wherein said locking device is formed integrally with said switch.

35. The film cartridge loading device according to claim 31, wherein said switch comprises a device which holds said locking device.

36. The film cartridge loading device according to claim 27, wherein said detection means comprises an indicator which indicates that the film cartridge is inserted into the desired position in said film cartridge chamber.

37. The film cartridge loading device according to claim 36, wherein said detection device comprises an indicator which indicates that the film cartridge is not inserted in said film cartridge chamber.

38. The film cartridge loading device according to claim 27, wherein said detection device comprises a display which displays that the film cartridge is inserted into the desired position in said film cartridge.

39. The film cartridge loading device according to claim 38, wherein said detection device comprises a display which displays that the film cartridge is not inserted in said film cartridge chamber.

40. An image recording medium loading device for a camera, said device comprising:
   a chamber in which an image recording medium is loaded by being inserted therein;
   a holding device which automatically holds the image recording medium in the chamber only in response to full insertion of the image recording medium into said chamber, said holding device holding the image recording medium in a position in which the image recording medium is in alignment with an image recording medium transporting path for photographic operation of the image recording medium loaded into said chamber; and
   a detection device which detects a position of said holding device and which determines whether the image recording medium is loaded in the position by said holding device, in accordance with the position of said holding device.

41. The image recording medium loading device according to claim 40, further comprising a lid for closing said chamber, and wherein said detection device comprises an indicator which indicates that the image recording medium is not loaded into the desired position in said loading area by restricting a closing operation of said lid of said chamber.

42. The image recording medium loading device according to claim 40, wherein said detection device comprises a display for displaying that the image recording medium is not loaded into the desired position in said chamber.

43. The image recording medium loading device according to claim 40, wherein said detection device comprises a device which provides an audible alarm that the image recording medium is not loaded into the desired position in said chamber.

44. The image recording medium loading device according to claim 40, wherein said detection device comprises a switch which determines that said holding device is not holding the image recording medium loaded into said chamber.

45. The image recording medium loading device according to claim 44, wherein said switch comprises an elastic member which urges said holding device.

46. The image recording medium loading device according to claim 45, wherein said switch comprises a device which holds said holding device.

47. The image recording medium loading device according to claim 45, wherein said holding device is formed integrally with said switch.

48. The image recording medium loading device according to claim 44, wherein said switch comprises a device which holds said holding device.

49. The image recording medium loading device according to claim 40, wherein said detection means comprises an indicator which indicates that the image recording medium is loaded in said chamber.

50. The image recording medium loading device according to claim 49, wherein said detection means comprises an indicator which indicates that the image recording medium is not loaded into the desired position in said chamber.

51. The image recording medium loading device according to claim 40, wherein said detection device comprises a display which displays that the image recording medium is loaded into the desired position in said chamber.

52. The image recording medium loading device according to claim 51, wherein said detection device comprises a display which displays that the image recording medium is not loaded in said chamber.

53. A camera comprising:
   a chamber in which a loading unit is loaded by being inserted therein in a longitudinal direction of the loading unit;
   a locking device which automatically locks the loading unit in said chamber only in response to full insertion of the loading unit into said chamber, said locking device locking the loading unit in a position in which the loading unit is in alignment for photographic operation, said locking device being separate from a cover for closing said chamber; and
   a determining device which determines whether the loading unit is locked by said locking device in the position, in accordance with a detected position of said locking device.

54. A camera comprising:
   a film cartridge chamber in which a film cartridge is loaded by being inserted therein in an axial direction of the film cartridge;
   a holding device which automatically holds the film cartridge in said film cartridge chamber only in response to full insertion of the film cartridge into said film cartridge chamber, said holding device holding the film cartridge in a position in which a film in the film cartridge is in alignment with a film transporting path for photographic operation, said holding device being separate from a cover for closing said film cartridge chamber; and
   a determining device which determines whether the film cartridge is held by said holding device in the position in accordance with a detected position of said holding device.

55. A camera comprising:
   a chamber in which an image recording medium cartridge is loaded by being inserted therein in a longitudinal direction of the image recording medium cartridge;
   a holding device which automatically holds the image recording medium in said chamber only in response to full insertion of the image recording medium cartridge into said chamber, said holding device holding the image recording medium cartridge in a position in which the image recording medium cartridge is in alignment for photographic operation, said holding device being separate from a cover for closing said chamber; and a determining device which determines whether the image recording medium cartridge is held by said holding device in the position in accordance with a detected position of said holding device.

56. A camera comprising:

a chamber in which a loading unit is loaded by being inserted therein in a longitudinal direction of the loading unit;

a holding device which automatically holds the loading unit in said chamber only in response to full insertion of the loading unit into said chamber, said holding device holding the loading unit in a position which the loading unit is in alignment for photographic operation, said holding device being separate from a cover for closing said chamber; and a determining device which determines whether the loading unit is held by said holding device in the position, in accordance with a detected position of said holding device.

57. A loading apparatus for a camera comprising:

a chamber in which a loading unit is loaded by being inserted therein in a longitudinal direction of the loading unit;

a locking device which automatically locks the loading unit in said chamber only in response to full insertion of the loading unit into said chamber, said locking device locking the loading unit in a position in which the loading unit is in alignment for photographic operation, said locking device being separate from a cover for closing said chamber; and a determining device which determines whether the loading unit is locked by said locking device in the position in accordance with a detected position of said locking device.

58. A loading apparatus for a camera comprising:

a film cartridge chamber in which a film cartridge is loaded by being inserted therein in an axial direction of the film cartridge;

a holding device which automatically holds the film cartridge, in a desired positon in said film cartridge chamber only in response to full insertion of the film cartridge into said film cartridge chamber, said holding device holding the film cartridge in a position in which a film contained in the film cartridge is in alignment for photographic operation, said holding device being separate from a cover for closing said film cartridge chamber; and a determining device which determines whether the film cartridge is held by said holding device in the position in accordance with a detected position of said holding device.

59. A loading apparatus for a camera comprising:

a chamber in which an image recording medium cartridge is loaded by being inserted therein in a longitudinal direction of the image recording medium cartridge;

a holding device which automatically holds the image recording medium cartridge in said chamber only in response to full insertion of the image recording medium cartridge into said chamber, said holding device holding the image recording medium cartridge in a position in which an image recording medium contained in the image recording medium cartridge is in alignment for photographic operation, said holding device being separate from a cover for closing said chamber; and a determining device which determines whether the film cartridge is held by said holding device in the position in accordance with a detected position of said holding device.

60. A loading apparatus for a camera comprising:

a chamber in which a loading unit is loaded by being inserted therein in a longitudinal direction of the loading unit;

a holding device which automatically holds the loading unit in said chamber only in response to full insertion of the loading unit into said chamber, said holding device holding the loading unit in a position in which the loading unit is in alignment for photographic operation, said holding device being separate from a cover for closing said chamber; and a determining device which determines whether the loading unit is held by said holding device in the position in accordance with a detected position of said holding device.

* * * * *

UNITED STATES PATENT AND TRADEMARK OFFICE
CERTIFICATE OF CORRECTION

PATENT NO. : 5,799,222
DATED : August 25, 1998
INVENTOR(S) : MASAAKI ISHIHARA

It is certified that error appears in the above-identified patent and that said Letters Patent is hereby corrected as shown below:

On the title page,

<u>At [56] References Cited</u>

U.S. PATENT DOCUMENTS

Insert --4,952,967  8/1990  Kazumi et al.--.

<u>At [57] ABSTRACT</u>

Line 8, "claws" should read --claw--.

<u>Column 1</u>

Line 38, "or" (second occurrence) should be deleted.

<u>Column 5</u>

Line 3, "19 in" should read --18 in--.

<u>Column 6</u>

Line 57, "with" should read --with each--.

UNITED STATES PATENT AND TRADEMARK OFFICE
CERTIFICATE OF CORRECTION

PATENT NO. : 5,799,222
DATED : August 25, 1998
INVENTOR(S) : MASAAKI ISHIHARA

It is certified that error appears in the above-identified patent and that said Letters Patent is hereby corrected as shown below:

Column 8

Line 48, "equivalents" should read --equivalent--.

Column 13

Line 41, "cartridge," should read --cartridge--.

Signed and Sealed this

Fifteenth Day of June, 1999

Attest:

Attesting Officer

Q. TODD DICKINSON

Acting Commissioner of Patents and Trademarks